United States Patent [19]

Bechara et al.

[11] 4,165,412

[45] Aug. 21, 1979

[54] DELAYED ACTION CATALYSTS FOR POLYURETHANES

[75] Inventors: Ibrahim S. Bechara, Boothwyn; Dewey G. Holland, Chadds Ford, both of Pa.

[73] Assignee: Air Products and Chemicals, Inc., Allentown, Pa.

[21] Appl. No.: 937,249

[22] Filed: Aug. 28, 1978

Related U.S. Application Data

[62] Division of Ser. No. 758,722, Jan. 12, 1977, abandoned, which is a division of Ser. No. 497,138, Aug. 15, 1974, abandoned, which is a division of Ser. No. 292,344, Sep. 26, 1972, Pat. No. 3,862,150.

[51] Int. Cl.² .................. C08G 18/18; C08G 18/20; C08G 18/14
[52] U.S. Cl. .................. 521/121; 521/128; 521/129; 521/130; 528/53
[58] Field of Search .................. 521/121, 129; 528/53

[56] References Cited

U.S. PATENT DOCUMENTS

| | | | |
|---|---|---|---|
| 2,957,831 | 10/1960 | Parker | 521/121 |
| 3,706,687 | 12/1972 | Rudzki | 521/121 |
| 3,728,291 | 4/1973 | Carroll et al. | 528/53 |
| 3,769,244 | 10/1973 | Hashimoto et al. | 521/129 |
| 3,862,150 | 1/1975 | Bechara et al. | 521/121 |
| 4,009,130 | 2/1977 | Zimmerman et al. | 521/121 |

FOREIGN PATENT DOCUMENTS 848911  9/1960  United Kingdom ............ 521/129

*Primary Examiner*—H. S. Cockeram
*Attorney, Agent, or Firm*—Richard A. Dannells; Barry Moyerman

[57] ABSTRACT

Novel salts of tertiary amines and alpha-substituted carboxylic acids have advantages as delayed action thermally activated catalyts such as in urethane and epoxy catalysis. Some salts of tertiary amines tend to dissociate reversibly when heated. However, the compounds of the present invention preferentially decompose, irreversibly, to generate carbon dioxide when heated.

2 Claims, No Drawings

DELAYED ACTION CATALYSTS FOR POLYURETHANES

This is a division of application Ser. No. 758,722, filed Jan. 12, 1977, now abandoned, which is a division of application Ser. No. 497,138 filed on Aug. 15, 1974, now abandoned, which is a division of application Ser. No. 292,344 filed on Sept. 26, 1972 and issued as U.S. Pat. No. 3,862,150 on Jan. 31, 1975.

BACKGROUND OF THE INVENTION

1. Field of the Invention

The invention relates to the catalysis of urethane and epoxy resin reactions and particularly to the formation of such polymers in the form of cellular polyurethanes, polyurethane coatings, and epoxy bodies and films. The catalyst compositions comprise tertiary amine salts which decompose thermally to release the catalytically effective tertiary amine moiety.

2. Prior Art

In certain applications of polyurethanes and epoxy resins, it is desirable to prepare a composition comprising substantially all of the ingredients at a relatively low temperature and to bring about the rapid polymerization reaction at the time when the composition is heated to the activation temperature. When attempts are made to employ amines as the catalyst for such heat activatable compositions, difficulties are encountered because the amine tends to significantly promote polymerization at room temperature. Delayed reaction catalysis has previously been achieved by employing an acid salt of a tertiary amine. For example, a measure of delayed action catalysis has been achieved using materials such as the benzoate salt or the acetate salt of a tertiary amine. The propensity of such salts is to partly dissociate at room temperature as well as at elevated temperatures when introduced as catalyst in a polymer precursor system. Some dissociation occurs at room temperature, causing premature amine catalysis, thereby adversely shortening the useful "pot life" of the composition of ingredients. At elevated temperature reaction conditions, some of the amine has been unavailable for catalysis because of the reversibility of the dissociation phenomena.

In the balanced catalyzation of polyurethane compositions, it has been advantageous to use a mixture of amine catalyst and tin catalyst. However, the lack of compatibility between the benzoate salts of tertiary amines and tin catalysts has impaired growth of use of such catalyst compositions. Notwithstanding the continuing demand for polyurethane precursor compositions suitable for heat activated catalyzation, previous efforts to use the salts of tertiary amines as delayed action catalysts encountered troublesome disadvantages.

SUMMARY OF THE INVENTION

In accordance with the present invention catalysis of polyurethane and epoxy resin reactions is effected with a catalyst composition comprising tertiary amine irreversibly released at elevated temperature from the salt of a tertiary amine and an acid, said acid being characterized in being selected from carboxylic acids substituted in the alpha position with a moiety which promotes thermal decomposition at a temperature below 200° C. Such salts are of the general structure

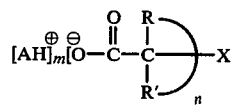

Where

A is an amine which contains at least one tertiary nitrogen atom;

R and R' are independently H, alkyl of $C_1$–$C_2$, or aryl;

X is a decomposition promoting group selected from CN, SO, $SO_2$, CO, $NO_2$, $COCH_3$, $CO\phi$;

m is an integer of 1 or 2;

n is 1 when X=CN, $NO_2$, $CO\phi$, $COCH_3$; and n is 2 when X=CO, SO, $SO_2$.

Representative compounds which may be employed as the catalyst for polyurethane formation and which will fall in the scope of this invention are

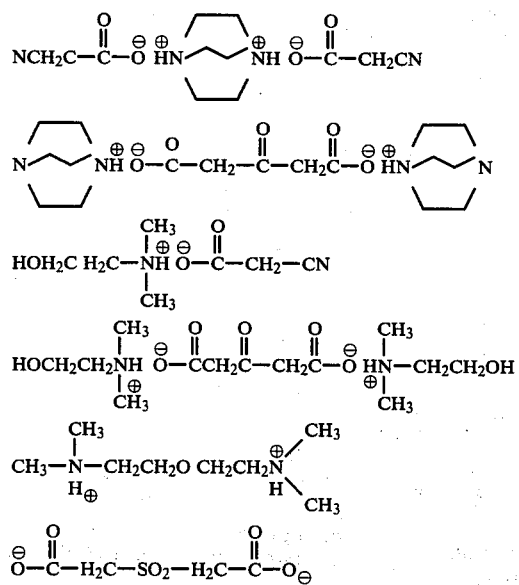

TEDA bis cyanoacetate bis TEDA acetone dicarboxylate

DMEA cyanoacetate bis DMEA acetone dicarboxylate 2,2'oxybis-(dimethylethylamino)-sulfonyl diacetate

*-continued*

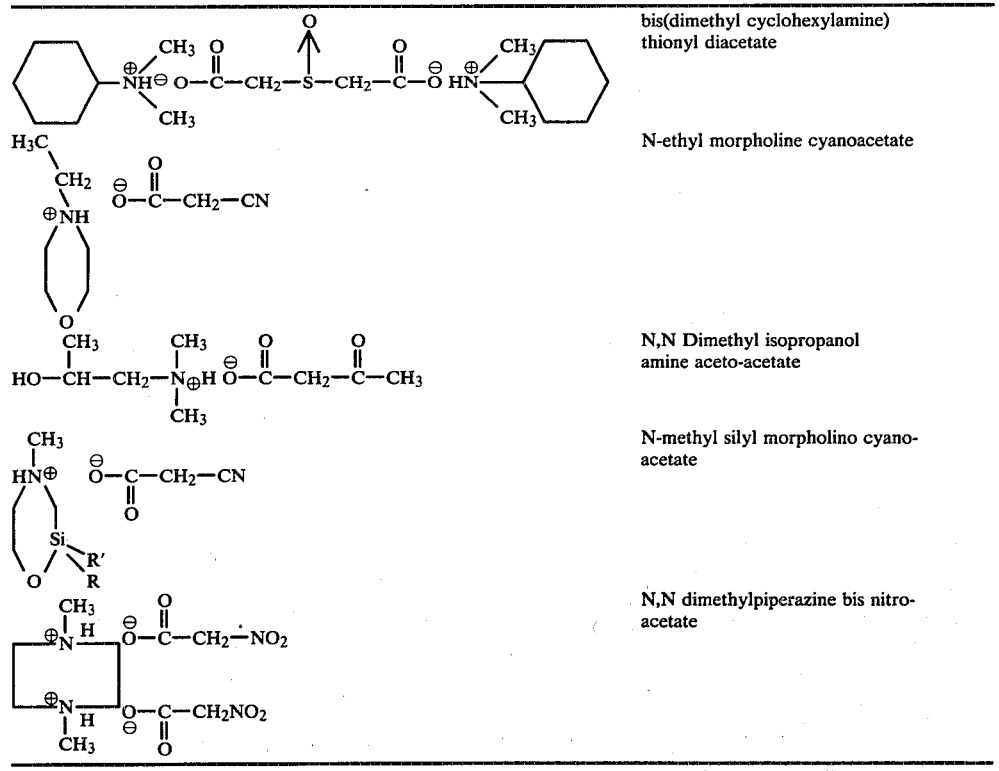

Alpha-substituted carboxylic acids that can be employed according to this invention include cyanoacetic acid, nitroacetic acid, acetone dicarboxylic acid, sulfonyl diacetic acid, thionyldiacetic acid, acetoacetic acid, benzoylacetic acid and the like.

Included in this invention are the salts of the above-described acids and of amines containing one or more tertiary nitrogen atoms, more specifically such amines include tetramethyl butane diamine (TMBDA), trimethyl aminoethyl piperazine (TAP), tetramethyl guanidine, azabicyclo heptanes, azabicyclooctanes, N-allyl piperidines, 2,2′oxybis-(morpholino ethyl ether), amidines, N-alkyl imidazoles, silyl morpholines, and the like.

The amine salts of the invention are generally prepared by mixing one mole of the amine and one mole of monobasic acid or one to two moles of dibasic acid. Bis-tertiary amine salts are prepared by mixing one mole of bis-tertiary amine and one to two moles of either monobasic or dibasic acid. While direct admixture of the amine and acid is possible it is preferred to use a solvent. Solvents that can be used include water, alcohols, ethers, or acetone. The preferred solvent is acetone. The temperature range of the reaction is between 30°–50° C. When reaction is complete the product salt is separated from the solvent as by filtration, centrifuging or other suitable means when the product is a solid; or the solvent may be removed by evaporation under reduced pressure where the product salt is a liquid. It is understood that the amine salts of the invention include the hydrates as well as the anhydrous forms. Thus, the product salt recovered from preparation in water-containing solvent may be in the hydrous form; or the anhydrous salt may be hydrated at or prior to its use as the activator-catalyst.

Because of this careful selection of the alpha-substituted carboxylic acid components of the amine salt, the amine salts undergo irreversible thermal decomposition at the temperature of activation as shown in reaction 2 instead of merely dissociating in a reversible manner as shown in reaction 1.

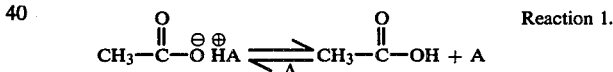

Reaction 1.

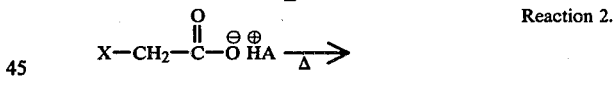

Reaction 2.

where A is an amine containing at least one tertiary nitrogen atom and X is as hereinbefore described.

The rapid, irreversible thermal decomposition of the acid component of the salt at the activation temperature liberates the tertiary amine for effective catalyzation of the aromatic or aliphatic polyisocyanate and polyol precursors, or epoxy precursor at the activation temperature. Thus the precursor formulation for the polyurethane or epoxy resin can contain the catalytic components comprising the salt of the tertiary amines at room temperature and maintain a prolonged shelf life and/or a prolonged pot life, notwithstanding the susceptibility of the decomposition for activation by the elevated temperature.

The proposed catalysts of the invention can be used solely as an activator for polyurethane or epoxy resin formation or as co-catalysts with other known catalysts, be it an amine catalyst or an organo metallic catalyst such as those derived from tin, silicon, antimony, lead, copper, iron or the like.

The compounds of the invention can also be used to an advantage in polyurethane formulations or epoxy resin precursors where blowing agents, pigmentation, fillers, surfactants and other additives are present.

The invention is further clarified by reference to a plurality of examples.

EXAMPLE I

A solution of 100 ml of acetone containing 0.2 mole of cyanoacetic acid was mixed with 100 ml of acetone containing 0.1 mole of triethylenediamine. The mixture of the two solutions led to the formation of a precipitate consisting of triethylenediamine bis cyanoacetate having a formula $$C_{12}H_{18}N_4O_4$$

This precipitate was dried in a vacuum oven at 60° C. Its melting point was established at 124° C. Analysis confirmed that the composition was the expected bis triethylenediamine dicyanoacetate.

|   | Calculated |   | Found |
|---|---|---|---|
| C | 51.06 | C | 50.72 |
| H | 6.38 | H | 6.32 |
| N | 19.86 | N | 19.49 |

In a similar manner, triethylenediamine monocyanoacetate was prepared. It too decomposed in the sublimer at 135–140 degrees. The analysis for $C_9H_{15}N_3O_2$ was as follows:

|   | Calculated |   | Found |
|---|---|---|---|
| C | 54.82 | C | 54.50 |
| H | 7.61 | H | 8.50 |
| N | 21.32 | N | 20.35 |

A polyisocyanato terminated polyester urethane, (Hughson's BX-A62-12), designed for vinyl coating was employed to evaluate catalytic activities in a series of tests at 100° C. Using 0.2 grams of triethylenediamine bis cyanoacetate in 10 grams of the prepolymer mixture, the curing time was 60 minutes. Using 0.3 grams per 10 grams, the curing time for the mixture was 45 minutes. Using 0.4 grams per 10 grams, the curing time was 30 minutes. Using 0.5 grams per 10 grams the curing time at 100° C. was 26 minutes. Such results are shown in Table 1 as follows:

Table 1

| Curing time at 100° C. using $NCCH_2CO_2H . N(C_2H_4)_3N . HO_2CCH_2CN$ | |
|---|---|
| grams catalyst | minutes for cure |
| 0.2 | 60 |
| 0.3 | 45 |
| 0.4 | 30 |
| 0.5 | 26 |

The same triethylenediamine bis cyanoacetate was evaluated as a curing agent of said coating prepolymer maintained at room temperature. Data relating to the uniformity of cure time notwithstanding variations in the amount of triethylenediamine bis cyanoacetate catalyst employed are shown in Table 2.

Table 2

| Curing time at room temperature using $NCCH_2CO_2H . N(C_2H_4)_3NHO_2CCH_2CN$ | |
|---|---|
| grams | hours |
| 0.20 | 24 |
| 0.30 | 24 |
| 0.40 | 24 |
| 0.50 | 24 |
| 0.60 | 24 |

As a control, a solution containing essentially 33% triethylenediamine in polypropylene glycol was employed as a comparison catalyst; also employing the same polyester urethane precursor in 10 gram lots. There was a significant variation in the curing time dependent upon the concentration of the catalyst both at room temperature and at 100° C., as shown in Tables 3 and 4.

Table 3

| Curing time at room temperature using 33% solution of $N(C_2H_4)_3N$ | |
|---|---|
| grams | hours |
| 0.22 | 3.55 |
| 0.33 | 3.62 |
| 0.44 | 2.92 |
| 0.55 | 2.38 |
| 0.66 | 1.50 |

Table 4

| Curing time at 100° C. using 33% solution of $N(C_2H_4)_3N$ | |
|---|---|
| grams | minutes |
| 0.33 | 113 |
| 0.44 | 90 |
| 0.55 | 65 |
| 0.66 | 53 |

The fact that the triethylenediamine bis cyanoacetate salt had a delayed action was evidenced by the fact that at room temperature it was significantly slower than the solution of triethylenediamine, whereas at 100° C. it was significantly faster. The data indicate that at elevated temperature, the triethylenediamine bis cyanoacetate is as useful a catalyst for the prepolymer as the solution of triethylenediamine, whereas, at room temperature, the triethylenediamine bis cyanoacetate exhibits greatly extended pot life.

EXAMPLE II

The decomposition temperature and characteristics of the triethylenediamine bis cyanoacetate was investigated by heating a 3.4 gram sample of the salt in a sublimer throughout a temperature range from 130° to 150° C., that is, above the melting point of 124° C. The gas evolved from the sublimer was passed through a gas bulb and into a gas meter. The evolved gas was identified as carbon dioxide by passage through a solution of barium hydroxide, whereby a white precipitate of barium carbonate was formed. After the decomposition of the salt, the residue was weighed and was found to be 1.30 grams, and was identified as triethylenediamine. The theoretical volume of gas 0.019 cu. ft., corresponded closely to the gas volume measured, 0.018 cu. ft. The measured weight of triethylenediamine as 1.30 gram closely corresponded to the theoretical amount of 1.34 gram.

It is to be understood that the terms "decomposition temperature" and "thermal activation temperature" are not synonymous in that the onset of decomposition of such salts is generally at a lower temperature than the "decomposition temperature" and progresses through an increasing temperature range. When employed as catalyst such salts at elevated temperature decompose and start an exothermic reaction in the polymerization which in turn promotes further decomposition of the catalytic salt.

EXAMPLE III

In a combination G.C. Mass Spectrometer instrument where the G.C. is equipped with 15 ft. chromatographic column packed with 15% Apiezon L on Gas Chromatograph Q substrate, several aqueous or methanolic solutions of the claimed salts were injected in the G.C. at 150° C. and the temperature of the column programmed from 100°–200° C.

The decomposition products of the salt were separated on the column then passed to the mass spectrometer by which they were identified. The following table summarizes the results obtained.

| Salt | Decomposition Products | Approximate % as determined from gas chromatography | Theoretical wt. % |
|---|---|---|---|
| TEDA bis cyanoacetate | $CO_2$ | 34.90 | 31.2 |
| | acetonitrile | 29.62 | 29.1 |
| | TEDA | 35.48 | 39.7 |
| bis DMEA acetone dicarboxylate | $CO_2$ | 20.0 | 27.2 |
| | acetone | 33.6 | 17.9 |
| | DMEA | 46.2 | 54.9 |
| 2,2'oxybis (dimethylethylamine) bis cyanoacetate | $CO_2$ | 30.1 | 26.7 |
| | acetonitrile | 23.9 | 24.8 |
| | 2,2'oxybis (dimethylethylamine) | 46.0 | 48.5 |
| TEDA acetone dicarboxylate | $CO_2$ | 24.2 | 23.8 |
| | acetone | 27.7 | 15.7 |
| | TEDA | 48.1 | 60.5 |
| TEDA thionyl diacetate | $CO_2$ | 42.4 | 31.7 |
| | DMSO | 3.0 | 28.0 |
| | TEDA | 53.4 | 40.3 |

EXAMPLE IV

A polyurethane precursor formulation containing 100 grams of polypropylene glycol having a molecular weight of about 3000, and marketed as CP-3000 was employed as the polyol. The precursor also contained 10 grams of a technical grade of tolylene diisocyanate comprising about an 80 to 20, 2,4- to 2,6-isomer ratio. At room temperature, the use of triethylenediamine bis cyanoacetate showed the same degree of cure during a 48 hour period in a series of tests using increasing amounts of the catalyst, thus indicating that the curing was occurring spontaneously and not by reason of the catalyst concentration. At 100° C. curing time was greatly shortened over the uncatalyzed formulation, the effect of catalyst concentration upon curing time was essentially the same using either the solution of the triethylenediamine or the triethylenediamine bis cyanoacetate salt. At a concentration of 0.1 grams of catalyst per 10 grams of precursor, the curing time was 14 minutes for both the decomposable salt and for the solution of triethylenediamine. Using 0.20 grams of catalyst per 10 grams of precursor, the curing time was 12 minutes for the decomposable salt, and 8 minutes for the solution of triethylenediamine. Using 0.4 grams of catalyst per 10 grams of precursor, the curing time was 8 minutes for the salt of triethylenediamine bis cyanoacetate and was 6 minutes for the solution of triethylenediamine. At room temperature, the curing times with the solution of triethylenediamine were 100, 60, 30, and 20 minutes for the quantities of 0.12, 0.24, 0.36 and 0.48 grams of catalyst, respectively, for 10 grams of polyurethane precursor.

Such data established that the triethylenediamine bis cyanoacetate is an effective delayed acting catalyst which can be activated by heat and provide the reliable and practical performance associated with a free triethylenediamine catalyst.

EXAMPLE V

A series of compounds having the desired easy decomposability was prepared from several acids and tertiary amines. The preparations were carried out in a round bottomed flask equipped with a reflux condenser and a mechanical stirrer by adding the equivalent amount of the amine needed to the acetone solution of the acid in the flask. The temperature of the reaction was maintained below 50° C. by means of external cooling. After the addition was completed the reaction mixture was cooled and the product isolated by filtration. The yields were quantitative.

After drying in vacuum oven the purity and the composition of the salt were confirmed by chemical analysis. The novel catalysts thus prepared included:

| Amine | Empirical formula | m.p. °C. | Analysis Calc. | Found |
|---|---|---|---|---|
| Triethylenediamine thionyldiacetate | $C_{10}H_{18}O_5S_1N_2$ | 103 | C,43.52 H, 6.70 N,10.12 | C,43.17 H, 6.47 N,10.07 |
| 4-(2'-dimethylaminoethyl)morpholine bis cyanoacetate | $C_{14}H_{24}N_4O_5$ | 74 | C,51.22 H, 7.32 N,17.07 | C,51.25 H, 7.43 N,16.96 |

EXAMPLE VI

About 100 parts of polyol mixture consists of about equal parts of polypropylene glycol having a molecular weight of about 2000 and a polyethylene glycol having a molecular weight of about 4000. The precursor contains about 12 grams tolylenediisocyanate per 100 grams polyol and 4 grams of triethylenediamine bis cyanoacetate. The precursor is employed in a coating machine in which a strip of fabric advancing through a coating zone is given a uniform thin coating of precursor. The coated fabric advances into zones in which the precursor undergoes the creaming, foaming, rising, and curing steps to bond the polyurethane foam coating onto the advancing fabric. The curing zone is maintained at 100° C., from which zone is withdrawn a cured polyurethane foam coated fabric. The precursor is maintained at substantially room temperature. It is important that the precursor have a long pot life so that there are not troublesome increases in the viscosity of the precursor during normal operations. The tertiary amine salt is prepared by the mixing of the triethylenediamine and sulfonyldiacetic acid in acetone and the filtration of the salt from the acetone. Using such salt as the catalyst the delayed action of the catalyst is quite satisfactory, a good product being obtained because of the decomposition of the salt, as distinguished from the mere dissociation of the salt occurring in a control using triethylenediamine diacetate salt.

EXAMPLE VII

A fabric having a polyurethane foam coating is prepared by using as the catalyst a mixture of 0.40 parts of catalyst per 10 parts of polyol, composed of 100 parts of ethylene glycol terephthalate, M.W. 3000, 20 parts of di(isocyanato-chlorophenyl)methane. The amine catalyst being the triethylenediamine acetone dicarboxylate in which the two acetyl groups are joined together by a carbonyl group. Such delayed action catalyst provides results superior to those obtained using a dibenzoate salt of triethylenediamine as the thermally activatable catalyst. The ease of thermal decomposition of the acetone dicarboxylate anion, and the minimized propensity for reversible dissociation of the amine salt are believed to be at least a partial explanation for the superior results.

EXAMPLE VIII

The delayed action catalyst is the salt of bis dimethylamino ethylether and thionyl diacetic acid. A small amount of dibutyltindiacetate catalyst constituting about 1/5 as much as the amine catalyst is employed in the precursor, which contains 100 parts of ethylene glycol terephthalate, M.W. 3000, 20 parts of di(isocyanato-chloro-phenyl)methane, 2.5 parts of the amine salt and 0.5 parts of dibutyltin diacetate. The polyurethane foam coated fabric production is satisfactory because of the advantageous delayed action and long stability of the catalyst precursor mixtures.

EXAMPLE IX

In the curing of an epoxy resin, a mixture of 10 parts of glycidyl polyether (Epon 828) and 1 part of amine curing agent was stirred for 2 minutes then allowed to cure at various temperatures. The following table gives comparative cure times for triethylenediamine and triethylenediamine bis cyanoacetate salt.

| | Cure Time in Minutes | |
|---|---|---|
| Cure Temperature °C. | TEDA | TEDA bis cyanoacetate |
| R.T. | 420 | >week |
| 50 | 48 | — |
| 80 | 11 | — |
| 100 | 8 | 55 |
| 135 | 3 | 12 |
| 150 | 1 | 8 |

Clearly this table shows that for applications where extended pot life is desirable the compound of the invention offers great advantage while exhibiting fully practical activity upon thermal activation.

EXAMPLE X

A polyurethane precursor composed of 100 parts polyol CP 3000 and 10 parts of tolylene diisocyanate (80/20 isomers 2,4-/2,6-ratio) was cured at room temperature and 100° C. using reversible amine salts. The following table gives the concentration of the reversible amine salt per 10 g polymer precursor as well as the cure time.

| Reversible Amine Salt | conc. | Cure time in min. at room temp. | Cure time in minutes at 100° C. |
|---|---|---|---|
| TEDA | 0.08 | 85 | 13 |
| diformate | 0.18 | 65 | 9 |
| | 0.23 | 45 | 6 |
| | 0.30 | 30 | 5 |

These room temperature data show the TEDA diformate affords only short pot life in contrast with the salts of the invention, such as illustrated in Example I, Table 2.

EXAMPLE XI

A prepolymer mix composed of 100 parts polyol CP 3000 and 10 parts 80/20 TDI was cured by varying amounts of triethylenediamine bis acetate (a reversible salt) both at room temperature and at 100° C. The following table summarizes the cure time in minutes vs. concentration.

| Amine salt | Conc. pph | Cure time in min. at R.T. | Cure time in minutes at 100° C. |
|---|---|---|---|
| TEDA bis | 0.08 | 106 | 10 |
| acetate | 0.17 | 51 | 6 |
| | 0.33 | 36 | 4 |

Where room temperature data show the triethylenediamine bis-acetate affords only short pot life in contrast with the salts of the invention, such as illustrated in Example I, Table 2.

Obviously, many modifications and variations of the invention as hereinbefore set forth may be made without departing from the spirit and scope thereof. Therefore, only such limitations should be imposed as are indicated in the appended claims.

What is claimed is:

1. A method for producing a polyurethane product which comprises polymerizing an organic polyisocyanate containing a plurality of isocyanato groups per molecule and an organic polyol containing a plurality of hydroxyl groups per molecule at a temperature in the range of about 70° C. to 200° C. in the presence of a delayed action catalyst comprising a tertiary amine salt of a carboxylic acid substituted in the alpha position selected from the group consisting of cyanoacetic acid, nitroacetic acid, acetone dicarboxylic acid, sulfonyl diacetic acid, thionyldiacetic acid, acetoacetic acid, and benzoylacetic acid, and said salt irreversibly decomposing to catalytically active tertiary amine selected from the group consisting of tetramethyl butane diamine, trimethyl aminoethyl piperazine, tetramethyl guanidine, azabicyclo heptanes, azabicyclooctanes, N-allyl piperidine, 2,2'oxybis-(morpholino ethyl ether), amidines, N-alkyl imidazoles, and silyl morpholines with decomposition of the acid component at a temperature in the range of about 70° C. to 200° C.

2. The method in accordance with claim 1 wherein said catalyst is N-ethyl morpholinocyanoacetate having the formula:

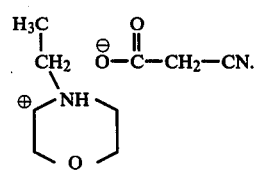

* * * * *